US010739030B2

(12) United States Patent
Malhotra et al.

(10) Patent No.: US 10,739,030 B2
(45) Date of Patent: Aug. 11, 2020

(54) SELF-LEARNING TEMPERATURE MONITOR AND CONTROL SYSTEM AND METHODS FOR MAKING AND USING SAME

(71) Applicant: Google LLC, Mountain View, CA (US)

(72) Inventors: Kara Malhotra, Pacifica, CA (US); Eric Burger, Redwood City, CA (US); Liana Kong, Redwood City, CA (US); Priya Kasirajan, Los Gatos, CA (US); Caitlin Donhowe, Mountain View, CA (US); Mark Rose, San Jose, CA (US); Lauren Von Dehsen, San Francisco, CA (US); Samuel Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 15/913,409

(22) Filed: Mar. 6, 2018

(65) Prior Publication Data
US 2019/0277528 A1   Sep. 12, 2019

(51) Int. Cl.
F24F 11/46   (2018.01)
F24F 11/64   (2018.01)
(Continued)

(52) U.S. Cl.
CPC .............. F24F 11/46 (2018.01); F24F 11/49 (2018.01); F24F 11/54 (2018.01); F24F 11/58 (2018.01);
(Continued)

(58) Field of Classification Search
None
See application file for complete search history.

(56) References Cited

U.S. PATENT DOCUMENTS 9,696,052 B2   7/2017  Malchiondo et al.
9,702,579 B2   7/2017  Warren et al.
(Continued)

FOREIGN PATENT DOCUMENTS

WO   0209363 A2   1/2002

OTHER PUBLICATIONS

Wollerton, M. "Ecobee's room sensors get smarter with Home Kit: You can now check the current temperature and motion activity of Ecobee's room sensors in Apple's Home app for iPhone." Jan. 12, 2017, available at https://www.cnet.com/news/ecobees-room-sensors-get-smarter-with-homekit/, 4 pp.
(Continued)

Primary Examiner — Mohammad Ali
Assistant Examiner — Saad M Kabir
(74) Attorney, Agent, or Firm — Kilpatrick Townsend & Stockton LLP

(57) ABSTRACT

Various arrangements for monitoring and controlling operation of a HVAC system are provided. Battery-operated temperature monitoring devices may be situated within the structure and connected with a network. A user command may be received that includes a selection of at least one of the battery-operated temperature monitoring devices. An offset may be calculated based on an evaluation of a first temperature reading of the selected battery-operated temperature monitoring device relative to a second temperature reading of the thermostat. The offset may be overridden when an override condition is present.

18 Claims, 8 Drawing Sheets

(51) Int. Cl.
*F24F 11/65* (2018.01)
*F24F 11/54* (2018.01)
*F24F 11/58* (2018.01)
*F24F 11/61* (2018.01)
*G05B 15/02* (2006.01)
*G05D 23/19* (2006.01)
*F24F 11/49* (2018.01)
*F24F 120/20* (2018.01)
*F24F 120/12* (2018.01)
*F24F 110/10* (2018.01)

(52) U.S. Cl.
CPC .............. *F24F 11/61* (2018.01); *F24F 11/64* (2018.01); *F24F 11/65* (2018.01); *G05B 15/02* (2013.01); *G05D 23/1905* (2013.01); *G05D 23/1917* (2013.01); *G05D 23/1932* (2013.01); *F24F 2110/10* (2018.01); *F24F 2120/12* (2018.01); *F24F 2120/20* (2018.01)

(56) References Cited

U.S. PATENT DOCUMENTS

| | | | |
|---|---|---|---|
| 2005/0040249 A1* | 2/2005 | Wacker | G05D 23/1905 236/51 |
| 2007/0040040 A1 | 2/2007 | Mueller | |
| 2009/0236433 A1 | 9/2009 | Mueller et al. | |
| 2010/0006660 A1 | 1/2010 | Leen et al. | |
| 2012/0305661 A1* | 12/2012 | Malchiondo | F24F 11/30 236/44 A |
| 2012/0325919 A1 | 12/2012 | Warren et al. | |
| 2013/0178986 A1 | 7/2013 | Lombard et al. | |
| 2016/0146495 A1 | 5/2016 | Malve et al. | |
| 2016/0153674 A1* | 6/2016 | Lancaster | H04Q 9/00 700/276 |
| 2017/0102153 A1 | 4/2017 | O'Hayer | |
| 2017/0176035 A1 | 6/2017 | Reeder et al. | |

OTHER PUBLICATIONS

Extended European Search Report dated Jun. 14, 2019 in European Patent Application No. 19160730.8, all pages.

Non-Final Office action dated Jun. 27, 2019 in U.S. Appl. No. 15/954,386, all pages.

Extended European Search Report dated Jul. 31, 2019 in European Patent Application No. 19168352.3, all pages.

\* cited by examiner

SELF-LEARNING TEMPERATURE MONITOR AND CONTROL SYSTEM AND METHODS FOR MAKING AND USING SAME

BACKGROUND

A heating, ventilation, and air conditioning (HVAC) system situated in a residential or commercial building has a thermostat associated therewith. The building includes at least a first area (e.g., a room) and a second area and the thermostat is located in the first area. A user sets the thermostat to a desirable temperature, and the thermostat regulates the HVAC system based on the difference between the user-defined temperature and the temperature of the first area as sensed by the thermostat. Even when the user primarily occupies the second area, the thermostat continues to regulate the HVAC system in view of the sensed temperature of the first area notwithstanding that the temperature of the second area is different from the temperature of the first area.

SUMMARY OF THE EMBODIMENTS

In an embodiment, a temperature monitor and control system comprises a temperature monitoring device wirelessly coupled to a network. The system has a thermostat remote from the temperature monitoring device and configured to regulate a HVAC system. The thermostat is coupled to the network and has a processor and a memory comprising computer-readable instructions. The processor is configured to execute the instructions to wirelessly receive a first temperature from the temperature monitoring device, obtain a second temperature from the thermostat, and determine an offset based on a difference between the first temperature and the second temperature. The processor is also configured to execute the instructions to apply the offset to the thermostat to cause the thermostat to regulate the HVAC system in view of the first temperature. The processor is further configured to execute the instructions to override the applied offset in response to a determination that a fail-safe condition is met.

In another embodiment, a computer-implemented method for monitoring and controlling operation of a HVAC system within a structure comprises providing a thermostat configured to regulate the HVAC system. The method includes situating a plurality of battery-operated temperature monitoring devices within the structure. The method comprises receiving a user command. The user command includes a selection of at least one of the battery-operated temperature monitoring devices. The method comprises computing an offset based on an evaluation of a first temperature reading of the at least one selected battery-operated temperature monitoring device relative to a second temperature reading of the thermostat. The method includes applying the offset to the thermostat to cause the thermostat to regulate the HVAC system in view of the first temperature reading.

In yet another embodiment, a method for monitoring and controlling operation of a HVAC system within a structure comprises providing a thermostat configured to regulate the HVAC system. The method includes situating a plurality of battery-operated temperature monitoring devices within the structure and coupling the thermostat and each of the plurality of battery-operated temperature monitoring devices to a network. The method comprises receiving over the network a user command that includes a selection of at least one of the battery-operated temperature monitoring devices. The method includes computing at the thermostat an offset based on an evaluation of a first temperature reading of the at least one selected battery-operated temperature monitoring device relative to a second temperature reading of the thermostat. The method comprises applying the offset to the thermostat to cause the thermostat to regulate the HVAC system in view of the first temperature reading. The method includes overriding the applied offset in response to a determination that an override condition is met.

DETAILED DESCRIPTION OF THE EMBODIMENTS

Figure 1:
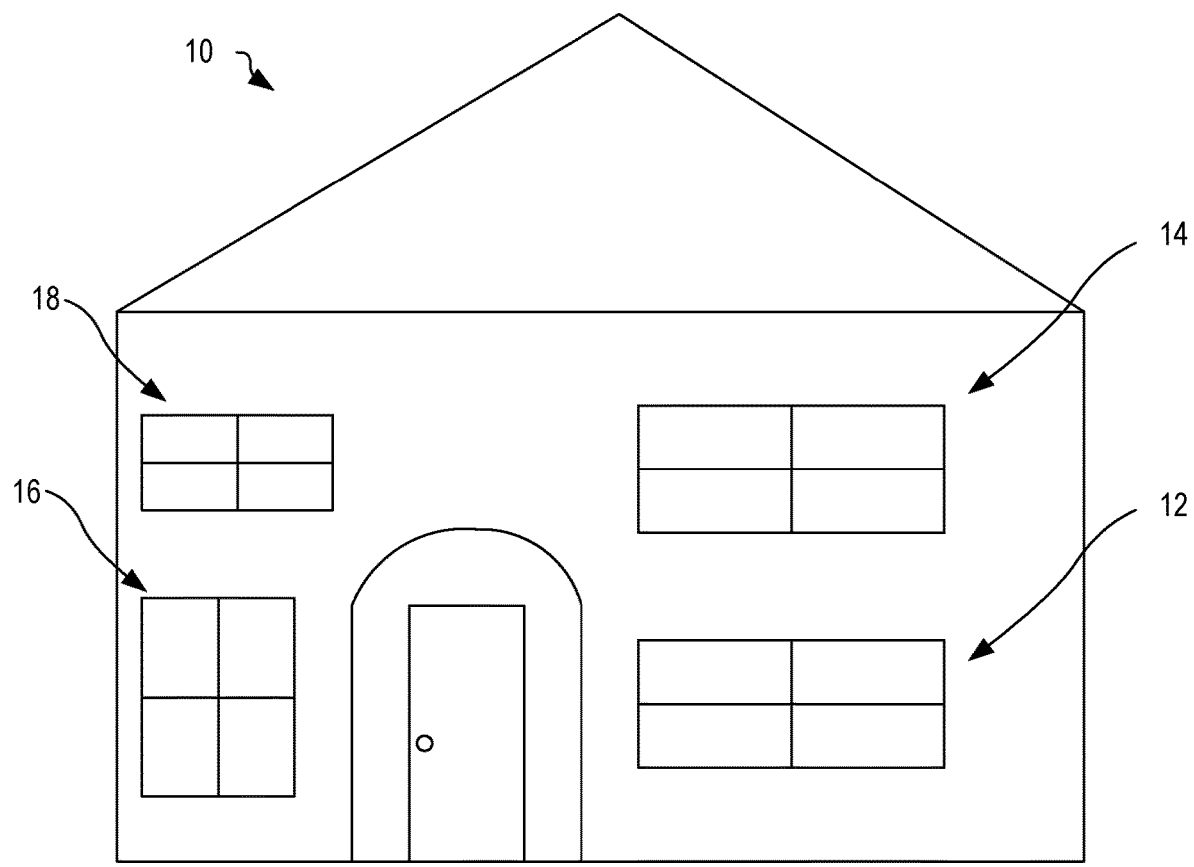
FIG. 1 is a diagram of a structure whose temperature is monitored and controlled by a self-learning temperature monitor and control system shown in FIG. 2.

FIG. 1 is a diagram of a structure 10 whose temperature is monitored and controlled by a self-learning temperature monitor and control system discussed further below. The illustrated structure 10 is a free-standing single-family dwelling. In embodiments, the structure 10 may be a duplex, an apartment within an apartment building, a commercial structure such as an office, a warehouse, a retail store, or a structure or enclosure that is a combination of the above. The structure 10 has a plurality of areas, such as a first room 12, a second room 14, a third room 16, and a fourth room 18. For the purposes of illustration, assume that the first room 12 is a first bedroom, the second room 14 is a second bedroom, the third room 16 is a living room, and the fourth room 18 is a game room. Assume further that the structure 10 is inhabited by a user 110 (FIG. 2) who primarily spends the evenings in the living room 16, primarily spends the nights in the first bedroom 12, and only sporadically uses the second bedroom 14 and the game room 18.

Figure 2:
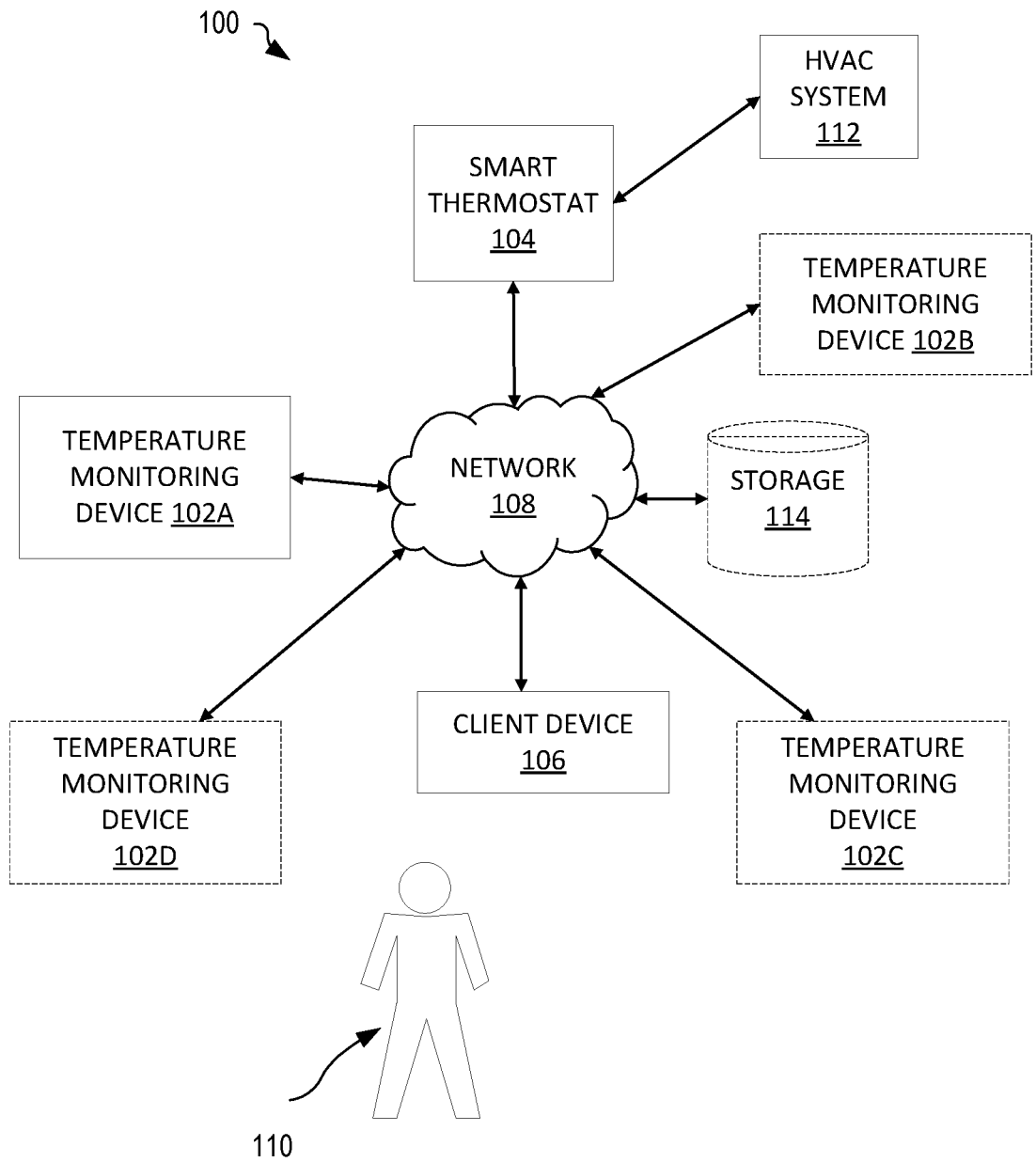
FIG. 2 is a schematic diagram of the self-learning temperature monitor and control system usable to monitor and control the temperature of the structure of FIG. 1, in an embodiment.

FIG. 2 shows an example self-learning temperature monitor and control system 100 that may be used to monitor and intelligently control the temperature within the structure 10. The system 100 may comprise a temperature monitoring device 102A, a smart thermostat 104, and a client device 106. Each of the temperature monitoring device 102A, the smart thermostat 104, and the client device 106 may be communicatively coupled to a network 108. As discussed herein, the smart thermostat 104 may, in embodiments, regulate a HVAC system 112 to control the temperature within the structure 10 in view of a temperature sensed by the temperature monitoring device 102A and reported to the smart thermostat 104 over the network 108.

In embodiments, the self-learning temperature monitor and control system 100 may optionally include additional temperature monitoring devices. For example, and as shown in FIG. 2, the system 100 may comprise a temperature monitoring device 102B, a temperature monitoring device 102C, and a temperature monitoring device 102D. The artisan will readily understand from the disclosure herein that the system 100 may likewise include any number of temperature monitoring devices, each of which may be configured to sense a temperature of an area in which they are located and report same over the network 108 to the smart thermostat 104. For illustrative purposes, assume that the first temperature monitoring device 102A, the second temperature monitoring device 102B, the third temperature monitoring device 102C, and the fourth temperature monitoring device 102D are located in the first bedroom 12, the second bedroom 14, the living room 16, and the game room 18, respectively. Of course, these temperature monitoring devices 102A, 102B, 102C, and 102D may also be located elsewhere in the structure 10. The HVAC system 112 may be located in one of the rooms 12, 14, 16, or 18, or in another area (e.g., in a utility room) within the structure 10. Assume that the smart thermostat 104 usable to regulate the HVAC system 112 is located in the second bedroom 14.

Forced air HVAC systems are the most common heating and cooling systems in use in North America today. In the prior art, it is generally impossible to use a forced air HVAC system to correctly balance the temperature of the various areas of a structure. For example, in the prior art, if the thermostat is located in the second bedroom 14 of the structure 10, the HVAC system 112 is regulated based on the difference between a user-defined temperature setting and the temperature of the second bedroom 14 as sensed by the thermostat, without regard to the temperature in the other rooms. If the thermostat is situated proximate a second bedroom window that receives direct sunlight, for example, the thermostat may cause the HVAC system 112 to deactivate the heating system or activate the cooling system even where the first bedroom 12 (or another area) occupied by the user 110 is frigid. In the same vein, if the thermostat is located in an area in the second bedroom 14 that is relatively cold, the thermostat may cause the HVAC system 112 to deactivate the cooling system or activate the heating system even if the first bedroom 12 (or another area) occupied by the user 110 is uncomfortably warm. The user 110 may thus be left to guess the temperature setting at which the thermostat in the second bedroom 14 is to be set to maintain the desired temperature in the first bedroom 12 (or another area occupied by the user 110). Such, of course, is undesirable. The problem is only exacerbated by factors such as changing ambient temperatures, leaky ductwork, poor insulation, etc., which may require that a different temperature be set at the thermostat in the second bedroom 14 at various points during the day to maintain the same temperature in the first bedroom 12 (or another area occupied by the user 110) throughout the course of the day. In embodiments, the system 100 may serve to remedy these problems by allowing the user 110 to cause the smart thermostat 104 to control the HVAC system 112 based on the temperature sensed by a temperature monitoring device (e.g., temperature monitoring device 102A) located in an area other than the area in which the smart thermostat 104 is located. For example, the user 110 may use the system 100 to cause the HVAC system 112 to be regulated in view of the temperature of the area in which the user 110 is present. As discussed herein, the system 100 may in embodiments be a self-learning system that evaluates previously collected temperature data to improve subsequent temperature regulation in the structure 10.

Figure 3:
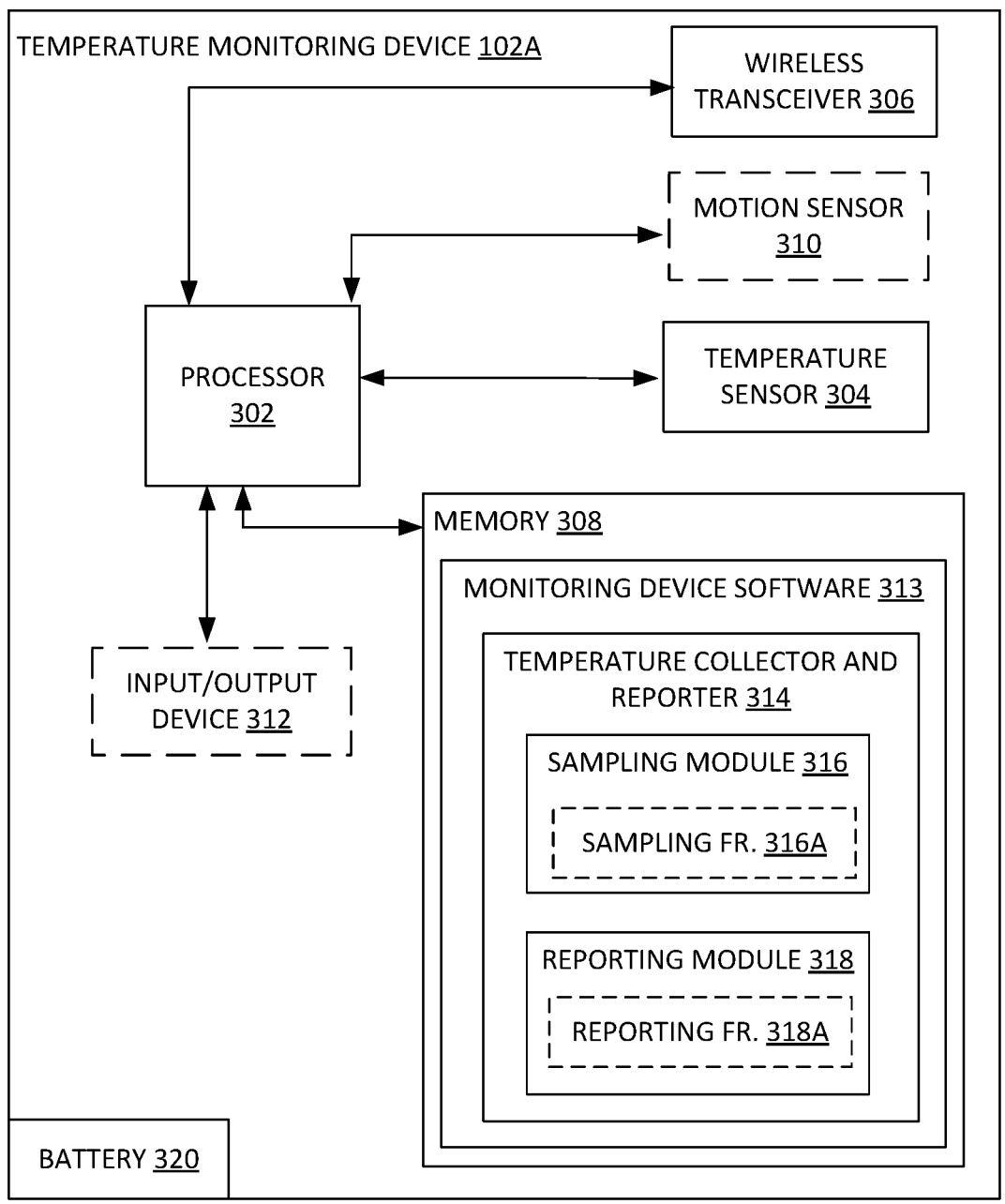
FIG. 3 is a schematic diagram of an example wireless temperature monitoring device of the self-learning temperature monitor and control system of FIG. 2.

Focus is directed to FIG. 3 which shows the temperature monitoring device 102A, in an embodiment. The other temperature monitoring devices 102B, 102C, and 102D may be generally identical to the temperature monitoring device 102A, except as specifically noted and/or shown, or would be inherent.

The temperature monitoring device 102A may be portable, and as discussed herein, may be battery operated. Alternately or additionally, the temperature monitoring device 102A may be configured to be plugged into a power outlet (e.g., a 110V/220V outlet). The temperature monitoring device 102A may include a processor 302 in communication with a temperature sensor 304, a wireless transceiver 306, and a memory 308. In embodiments, the temperature monitoring device 102A may optionally include a motion sensor 310, other sensor(s) 310A, and an input/output device 312. The motion sensor 310, the other sensor (s) 310A, and the input/output device 312, where included, may also be in communication with the processor 302.

The processor 302 may comprise any suitable processor or processors, such as a digital microprocessor, a supplementary co-processor, a math-coprocessor, etc. In embodiments, part or all of memory 308 may be integrated into processor 302. In some embodiments, the processor 302 may be configured through particularly configured hardware, such as an application specific integrated circuit (ASIC), field-programmable gate array (FPGA), etc., and/or through execution of software to perform functions in accordance with the disclosure herein.

The temperature sensor 304 may be configured to sense the temperature of an area within which the temperature monitoring device 102A is located. The temperature sensor 304 may include any suitable contact or non-contact temperature sensor, such as a bimetallic temperature sensor, a resistive temperature detector, a thermocouple, a thermistor, a thermometer, etc. The wireless transceiver 306 may be configured to wirelessly exchange information with other components of the system 100 over the network 108 (FIG. 2). In embodiments, the wireless transceiver 306 may instead be a transmitter configured to wirelessly convey data over the network 108. The network 108 may be any suitable wireless network (or a network that has both wired and wireless components), e.g., a Wi-Fi network, a public switched telephone network, the Internet, a local intranet, a PAN (Personal Area Network), a LAN (Local Area Network), a WAN (Wide Area Network), a MAN (Metropolitan Area Network), a virtual private network (VPN), a storage area network (SAN), a Z-wave network, a BLUETOOTH network (an example of a wireless technology for exchanging data over a relatively short distance and for building a personal area network), and/or a combination thereof.

Memory 308 represents one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The memory 308 may include monitoring device software 313, which may be stored in a transitory and/or a non-transitory portion of the memory 308. Monitoring device software 313 includes machine readable instructions that are executed by processor 302 to perform the functionality of the temperature monitoring device 102A as described herein.

In an embodiment, the monitoring device software 313 may include a temperature collector and reporter 314. The temperature collector and reporter 314 may comprise a sampling module 316 and a reporting module 318. The sampling module 316 may be configured to periodically sample the temperature sensed by the temperature sensor 304. The reporting module 318 may be configured to report the sensed temperature over the network 108 to the smart thermostat 104. Some or all communications transmitted by the monitoring device 102A may include a unique identifier identifying the particular device (e.g., device 102A in this example) from which the communication is sent over the network 108. In embodiments, the device 102A may further have associated therewith a unique code (e.g., unique machine readable indicia may be situated on the housing of the device 102A) to allow the user 110 to readily differentiate that device 102A from other devices 102B-102D.

The sampling module 316 may have a sampling frequency 316A, i.e., a frequency at which the sampling module 316 samples the temperature sensed by the temperature sensor 304. The reporting module 318 may have a reporting frequency 318A, i.e., a frequency at which the reporting module 318 reports the sampled temperature(s) over the network 108 to the smart thermostat 104. In embodiments, the sampling frequency 316A may be greater than the reporting frequency 318A. For example, in an embodiment, the sampling module 316 may sample the temperature sensed by the temperature sensor 304 once every minute and the reporting module 318 may report the sampled temperatures to the smart thermostat 104 once every five minutes (i.e., the reporting module 318 may transmit a data stream every five minutes that includes the five temperature readings sampled by the sampling module 316 in the last five minutes). Sampling the temperature at a higher sampling frequency 316A and reporting the temperature at a lower reporting frequency 318A may conserve battery life (as compared to both sampling and reporting the temperature at the same higher sampling frequency 316A). Furthermore, sampling the temperature at a higher sampling frequency 316A and reporting the temperature at a lower reporting frequency 318A may allow for data to be collected with high granularity (as compared to both sampling and reporting the temperature at the same lower reporting frequency 318A). The artisan will understand that the sampling frequency 316A of the sampling module 316 may be any frequency that is greater than the reporting frequency 318A of the reporting module 318. In other embodiments, the sampling frequency 316A may be equal to the reporting frequency 318A.

In some embodiments, the sampling frequency 316A and/or the reporting frequency 318A may be respectively set by the sampling module 316 and the reporting module 318 dynamically. For example, the sampling module 316 and/or the reporting module 318 may adaptively change the sampling frequency 316A and/or the reporting frequency 318A, respectively, based on the operation of the HVAC system 112. In embodiments, the sampling frequency 316A and/or the reporting frequency 318A may be increased when the HVAC system 112 is actively heating or cooling the structure 10, and may be decreased when the HVAC system 112 is in its steady state (i.e., is not heating or cooling the structure 10). Setting the sampling frequency 316A and/or the reporting frequency 318A adaptively in this fashion may allow the HVAC system 112 to be regulated with greater precision without putting an undue strain on the battery 300 of the device 102A.

The motion sensor 310, where included, may be a passive infrared motion detector, a microwave sensor, an ultrasonic sensor, an area reflective type sensor, a vibration detector, etc. As discussed herein, the motion sensor 310 may in embodiments be used to determine the area in which the user 110 is currently present so that the HVAC system 112 may be controlled using the temperature monitoring device 102A-102D closest to that area. The other sensor(s) 310A, where provided, may include a smoke detector, a security system sensor, an air pollution sensor, a gas detector, a sunlight detector, a humistor, etc. In embodiments, one or more of the other sensors 310A may be included in a housing of the temperature monitoring device 102A (discussed below). Alternately or additionally, one or more other sensors 310A may be provided elsewhere. For example, one or more of the other sensors 310A may be mounted in a room in the structure 102. Or, for instance, one or more of the other sensors 310A may be part of another system (such as a fire detection and alarm system) in wireless communication with the temperature monitoring device 102A. The other sensors 310A may be battery powered and/or may be powered using other means (e.g., via 110V/120V power outlets).

In embodiments, the user 110 may be able to interact with (e.g., direct the operation of) the system 100 using the client device 106 discussed further below, such as via a temperature monitor and control application 510 (FIG. 5) downloaded and stored thereon. In some embodiments, the temperature monitoring device 102A may include the input/output device 312 and the user 110 may alternately or additionally use same to interact with the system 100. The input/output device 312 may comprise any suitable input and/or output device, such as a display, a speaker, a microphone, a touch screen, a button, a knob, a switch, etc.

While not expressly shown in FIG. 3, the temperature monitoring device 102A may further have a housing, which may, in embodiments, be configured to be replaceable. For example, in an embodiment, the user 110 may replace the housing of the temperature monitoring device 102A with a differently colored (or shaped) housing to suit the décor in the first bedroom 12. In embodiments, the temperature monitoring device housing may be configured to be permanently or removably secured (e.g., via a fastener, an adhesive, a latch, and/or other means (such as magnetically)) to a desired location within the first room 12. In embodiments, the temperature monitoring device 102A may have a relatively small form factor (e.g., on the order of an inch, a few inches, etc.) so as to ensure that the temperature monitoring device 102 does not substantially detract from the appearance of the room in which it is situated. In some embodiments, one or more temperature monitoring devices 102A-102D may be part of another device (e.g., may be housed in the housing of another device), such as a security system component, a smart speaker, a smart appliance, a smoke sensor, etc.

The temperature monitoring device 102A may be powered by a battery 320, such as a lithium battery, a lithium-ion battery, a nickel-cadmium battery, etc. The battery 320 may, in embodiments, be rechargeable (e.g., the user 110 may charge the battery wirelessly; alternatively, or in addition, the housing of the device 102A may have a port for allowing the user 110 to charge the battery 320 via a USB or other wired connection). In some embodiments, the battery 320 may be disposable (e.g., the housing of the device 102A may have an openable section for allowing the user 110 to replace the battery 320). In some embodiments, the battery 320 may comprise two or more batteries of the same or different type (e.g., a portable battery, a rechargeable battery, a disposable battery, etc.). In embodiments, the input/output device 312 may indicate the battery level of the device 102A to allow the user 110 to replace same when required.

Figure 4:
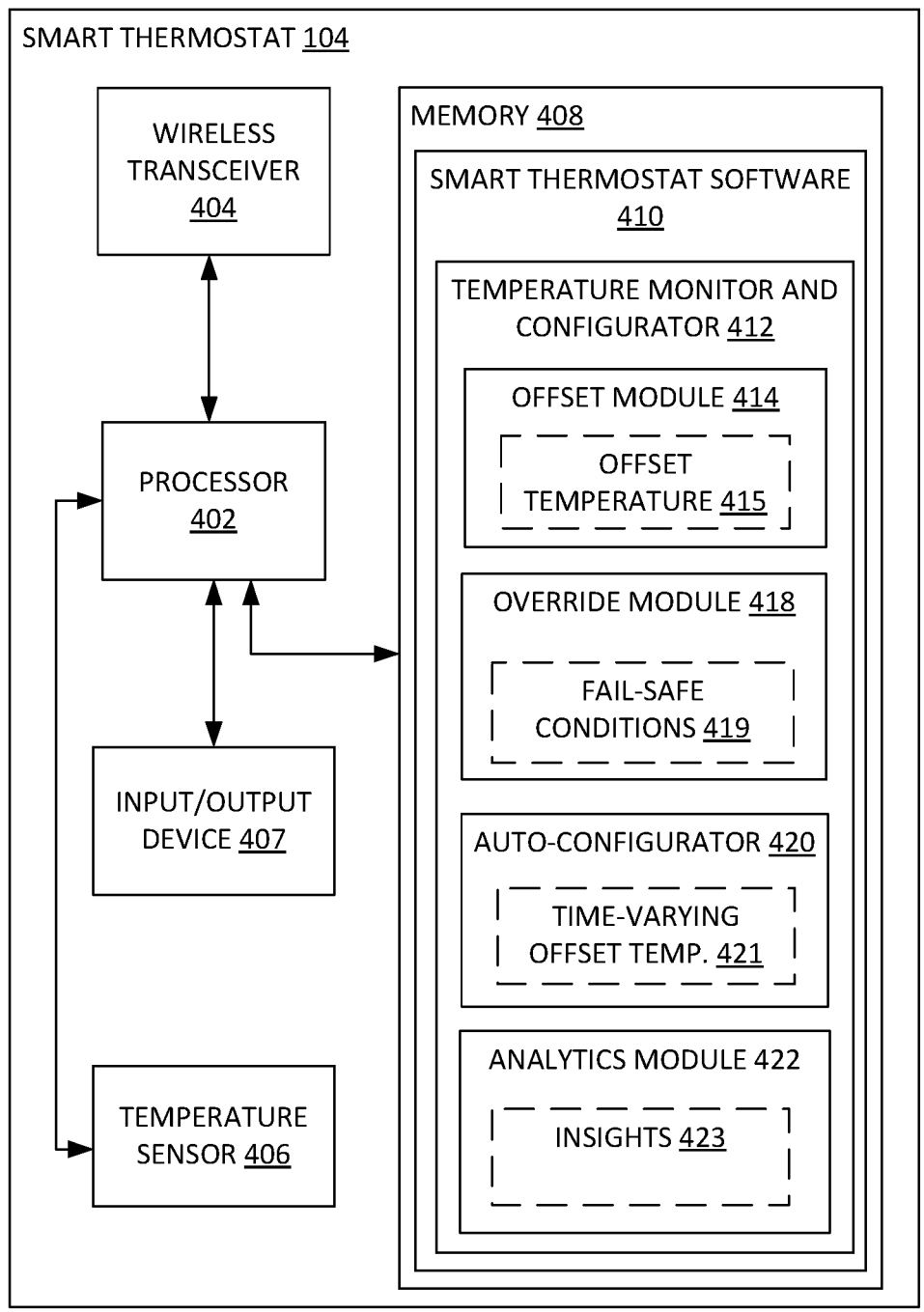
FIG. 4 is a schematic diagram of an example smart thermostat of the self-learning temperature monitor and control system of FIG. 2.

Focus is directed now to FIG. 4, which shows the smart thermostat 104, in an embodiment. The smart thermostat 104 may comprise a processor 402 in data communication with a wireless transceiver 404, a temperature sensor 406, an input/output device 407, and a memory 408. The processor 302 represents a digital processor and may include any suitable processor or processors. In embodiments, part or all of memory 408 may be integrated into processor 402. In some embodiments, the processor 402 may be configured through particularly configured hardware, such as an application specific integrated circuit (ASIC), field-programmable gate array (FPGA), etc., and/or through execution of software to perform functions of the smart thermostat 104 in accordance with the disclosure herein.

The wireless transceiver 404 may be configured to wirelessly transmit and/or receive information (e.g., receive temperature information from the temperature monitoring devices 102A-102D, transmit and receive information to and from the client device 106, etc.) over the network 108. The temperature sensor 406 may be a temperature sensor of the type discussed above for the temperature sensor 304. The temperature sensor 304 employed in a temperature monitoring device (e.g., device 102A) may be the same as or different from the temperature sensor 406 employed in the smart thermostat 104. The input/output device 407 may comprise any suitable input and/or output device, such as a keypad, a display, a speaker, a microphone, a touch screen, a button, a switch, etc. The input/output device 407 may allow the user 110 to functionally interact with the smart thermostat 104 to control the operation of the system 100. In embodiments, and as discussed herein, the user 110 may alternately or additionally interact with the smart thermostat 104 via the temperature monitor and control application 510 stored on client device 106.

Memory 408 represents one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The memory 408 may include smart thermostat software 410, which may be stored in a transitory and/or a non-transitory portion of the memory 408. Software 410 includes machine readable instructions that are executed by processor 402 to perform the functionality of the smart thermostat 104 as discussed herein. In embodiments, a temperature monitoring device (e.g., device 102A) may include some or all of the functionality of the smart thermostat 104 (e.g., include all or part of the monitoring device software 313 and the smart thermostat software 410).

Storage 114 (FIG. 2), where provided, may supplement or replace the memory 408 in whole or in part. For example, in embodiments, all or part of the software 410 and/or the software 313 may be stored in the storage 114. Or, for instance, the temperature data collected by the thermostat 104 (as discussed below) may be stored in whole or in part in the storage 114. The storage 114 may be any storage device accessible by the smart thermostat 104 (e.g., over the network 108). For example, the storage 114 may be a secure or other cloud storage device, a USB memory stick, an SD or micro SD card, etc. In embodiments, where the temperature reading of a particular temperature monitoring device (e.g., device 102A) is queried by the user as discussed herein, the response to the query may be generated by accessing data collected by the temperature monitoring device 102A and stored in the storage 114 (e.g., the cloud). In embodiments, and based on the size of the storage 114, the data in the storage 114 may be periodically (e.g., once every six months, once every year) deleted and/or transferred to another storage in communication with the storage 114.

Software 410 may comprise a temperature monitor and configurator 412. In an embodiment, the temperature monitor and configurator 412 may include an offset module 414, an override module 418, an auto-configurator 420, and an analytics module 422.

The offset module 414 may be configured to calculate an offset temperature 415 and may further be configured to cause the thermostat 104 to operate at this offset 415. The override module 418 may be configured to override a user input based on a determination that a fail-safe condition (or an "override condition") 419 is met. The auto-configurator 420 may be adapted to calculate a time-varying offset temperature 421 and may further be adapted to cause the thermostat 104 to operate at this time-varying offset 421. The analytics module 422 may be configured to generate pertinent insights 423 regarding the temperatures sensed by the various monitoring device temperature sensors 304 and the thermostat temperature sensor 406 for user consumption.

In more detail, the offset module 414 may be configured to determine the offset temperature 415 based on an evaluation of the temperature reading of the thermostat temperature 406 relative to the temperature reading(s) of the temperature sensor(s) 304 of one or more temperature monitoring devices 102A-102D (e.g., of one or more temperature monitoring devices 102A-102D selected by the user 110). For example, in an embodiment, the offset module 414 may be configured to determine the offset temperature 415 by computing the difference between the temperature reading of the thermostat temperature sensor 406 and the temperature reading(s) of the temperature sensor(s) 304 of one or more temperature monitoring devices 102A-102D. For instance, if the temperature sensor 406 of the thermostat 104 indicates that the temperature is 60° F. and the temperature sensor 304 of the temperature monitoring device (e.g., device 102A) selected by the user 110 indicates that the temperature is 70° F., the offset module 414 may determine that the offset temperature 415 is 10° F. and cause the smart thermostat 104 to operate at this 10° F. offset. Put differently, if the user 110 selects the first temperature monitoring device 102A in this example, the offset module 414 may effectively cause the smart thermostat 104 to adopt the temperature reading of the temperature sensor 304 of the first temperature monitoring device 102A as its own so that the HVAC system 112 may be regulated based on the temperature sensed by the temperature sensor 304 of the first temperature monitoring device 102A (as opposed to the temperature sensed by the temperature sensor 406 of the thermostat 104). The offset module 414 may likewise allow the user 110 to select any temperature monitoring device 102B-102D to cause the smart thermostat 104 to regulate the temperature within the structure 10 based on the temperature sensed by the temperature sensor 304 of that device. The user 110 may thus select any of the temperature monitoring devices 102A-102D (e.g., the device 102A-102D closest to the user 110) to cause the HVAC system 112 to regulate the temperature of the structure 10 based on the temperature of this area (as opposed to regulating the HVAC system 112 based on the temperature of the area in which the thermostat 104 is located). In some embodiments, the offset module 414 may determine the offset temperature 415 by determining a difference between an average temperature reading of the selected temperature monitoring device 102A-102D (e.g., the average temperature reading of the selected device 102A-102D over the last five minutes, the last hour, the last day, etc.) and the temperature reading of the smart thermostat temperature sensor 406. Alternately or additionally, the offset module 414 may determine a median of the temperature reading(s) of the selected device(s) 102A-102D and compare this median to the smart thermostat temperature sensor 406 to determine the offset temperature 415.

The user 110 may select a temperature monitoring device 102A-102D in one or more of a number of ways. In embodiments, and as discussed herein, the user 110 may use the client device 106 (e.g., the temperature monitor and control application 510 stored thereon) to select one of the temperature monitoring devices 102A-102D. Alternately or in addition, the user 110 may use the input/output device 312 of the respective temperature monitoring device 102A-102D to select same (e.g., the user 110 may depress a button on one of the temperature monitoring devices 102A-102D to select that temperature monitoring device). In embodiments, the user 110 may be able to alternately or additionally select (and/or otherwise interact with) a temperature monitoring device 102A-102D via voice command. In other embodiments still, the user 110 may alternately or additionally use the input/output device 407 of the smart thermostat 104 to select any of the temperature monitoring devices 102A-102D. The user 110 may also choose the thermostat 104 instead of a temperature monitoring device 102A-102D to cause the thermostat 104 to operate at a 0° F. offset (e.g., when the user 110 is in the second bedroom 14 where the smart thermostat 104 is located, the user 110 may select the thermostat 104 to cause the thermostat 104 to operate the HVAC system 112 based on the temperature readings obtained by its own temperature sensor 406).

The user 110 may, in embodiments, employ the offset module 414 to determine the offset temperature 415 by averaging the temperature sensor readings of two or more temperature monitoring devices 102A-102D and comparing this average temperature to the temperature reading indicated by the smart thermostat temperature sensor 406. For example, if the user 110 is going back and forth between the first bedroom 12 and the living room 16, the user may use the offset module 414 to effectively cause the smart thermostat 104 to adopt the average of the readings obtained by the temperature monitoring devices 102A and 102C as its own.

In some embodiments, and particularly where the temperature monitoring devices 102A-102D include the motion sensor 310, the offset module 414 may first ascertain which temperature monitoring device 102A-102D is currently closest to the user 110, and then determine the offset temperature 415 by computing the difference between the temperature sensor reading of this device 102A-102D and the temperature sensor reading of the thermostat temperature sensor 406. Such functionality, where provided, may render it unnecessary for the user 110 to manually select the temperature monitoring device 102A-102D closest to the user 110. Where the structure (e.g., dwelling) 10 includes multiple residents, the offset module 414 may select the temperature monitoring device 102A-102D whose motion sensor 310 detects the greatest number of movements. In some embodiments, the offset module 414 may compute a blended offset temperature by attributing different weights to the temperatures sensed by the different temperature monitoring devices 102A-102D. For example, in an embodiment, the offset module 414 may determine a blended average of the temperatures of the temperature monitoring devices 102A-102D by attributing a greater weight to a temperature monitoring device 102A-102D located in high traffic areas and attributing a lower weight to the temperature monitoring devices 102A-102D in lower traffic areas, and then compute the blended offset by evaluating the difference between the thermostat temperature and the blended average. In embodiments, instead of computing an offset as described herein, the smart thermostat 104 may simply regulate the HVAC system 112 based on the temperature readings reported to the smart thermostat 104 by one or more temperature monitoring devices 102A-102D (e.g., one or more user-selected temperature monitoring device(s)).

The override module 418, also referred to herein as a "fail-safe module" 418, may be configured to determine whether the temperature setting set by the user 110 for the HVAC system 112 is (or becomes) atypical. If the override module 418 determines that the temperature setting set by the user 110 is atypical (e.g., where the temperature sensed by the temperature monitoring device 102A-102D selected by the user 110 would cause the cooling system to activate but the temperature sensor 406 of the thermostat 104 indicates that it is uncomfortably cold), the override module 418 may override the user input to cause the HVAC system 112 to operate in view of the temperature sensed by the temperature sensor 406 of the thermostat 104 itself.

A user-selected temperature setting may for example be atypical where the portable temperature monitoring device 102A-102D selected by the user 110 is moved from one location to another (e.g., where the selected device 102A falls from a wall of the first room 12 and lands on a cold tile floor, where the device 102A is inadvertently placed next to a window, where a child places the device 102A in a refrigerator, etc.). In such case, the override module 418 may override the user input to cause the thermostat 104 to revert to regulating the HVAC system 112 in view of the temperature readings of its own temperature sensor 406 (or another temperature sensing device 102A-102D, e.g., a secondary or backup temperature monitoring device 102A-102D selected by the user 110).

In more detail, the override module 418 may override a user input if one (or more) fail-safe conditions 419 is/are met. The fail-safe conditions 419 may be stored in a transitory and/or a non-transitory portion of the memory 408. In embodiments, one or more fail-safe conditions 419 may take into account the heating and cooling set points of the smart thermostat 104. The artisan understands that the smart thermostat 104, like other conventional thermostats, may have a heating set point and a cooling set point (e.g., the heating set point may be between 60° F. and 75° F. and the cooling set point may be between 70° F. and 85° F.). The fail-safe conditions 419 in one embodiment may include the four fail-safe conditions set forth in table 1 below; as noted, the override module 418 may override a user input and the thermostat 104 may revert to regulating the HVAC system 112 based on the temperature readings of its own temperature sensor 406 if any of these conditions are met. Those skilled in the art will appreciate that the fail-safe conditions 419 set forth herein are merely exemplary and are not intended to be independently limiting.

TABLE 1

| No. | Fail-safe conditions 419 | Result |
|---|---|---|
| 1 | (HVAC heating is off) AND ((temperature sensed by thermostat temperature sensor 406-heating set point) < −9° F.) | Activate HVAC heating |
| 2 | (HVAC heating is on) AND ((temperature sensed by thermostat temperature sensor 406-heating set point) > 9° F.) | Deactivate HVAC heating |
| 3 | (HVAC cooling is on) AND ((temperature sensed by thermostat temperature sensor 406-cooling set point) < −9° F.) | Deactivate HVAC cooling |
| 4 | (HVAC cooling is off) AND ((temperature sensed by thermostat temperature sensor 406-cooling set point) > 9° F.) | Activate HVAC cooling |

To illustrate, consider the first fail-safe condition 419. Assume that: (a) the ambient temperature is 40° F.; (b) the temperature sensor 406 of the smart thermostat 104 indicates that the temperature in the second bedroom 14 is 55° F.; (c) the user 110 selects the first temperature monitoring device 102A for the regulation of the HVAC system 112; (d) the first temperature monitoring device 102A initially indicates that the temperature is 50° F.; and (e) the first temperature monitoring device 102A subsequently indicates that the temperature is 90° F. because the first temperature monitoring device 102A is inadvertently placed next to a window in the first bedroom 12 that is receiving direct sunlight. If the override module 418 were not provided, the HVAC heating would be (or remain) deactivated because the temperature sensor 304 of the selected temperature monitoring device 102A indicates that the temperature is above the heating set point (i.e., is 90° F.). Such may cause the average temperature in the structure 10 to fall to uncomfortably low levels, which the user 110 may find undesirable. To remedy such problems, the override module 418 may periodically check whether any of the fail-safe conditions 419 are met, and in this example, ascertain that the first fail-safe condition 419 is satisfied (i.e., the HVAC heating is off and the difference between the temperature sensed by the thermostat temperature sensor 406 and the heating set point is less than −9° F.). This determination may in-turn cause the override module 418 to ascertain that the temperature of the area in which the selected temperature monitoring device 102A is situated is unusually high relative to the temperature sensed by the temperature sensor 406 of the thermostat 104. The override module 418 may resultantly override the user input (i.e., deselect the temperature monitoring device 102A selected by the user 110) and revert to regulating the HVAC system 112 in view of the temperature sensed by the temperature sensor 406 of the thermostat 104. As a result (see Table 1), the HVAC system 112 heat may be activated despite the fact that the temperature sensor 304 of the selected device 102A indicates that it is uncomfortably hot (e.g., is 80° F.). The other three fail-safe conditions 419 in Table 1 may likewise change the state of the HVAC 112 system and ensure that an atypical user input (e.g., an atypical user input that results from the movement or abnormal placement of the selected temperature monitoring device 102A-102D) is overridden.

In some embodiments, additional fail-safe conditions 419 may be provided. For example, in an embodiment, the selected temperature monitoring device (e.g., device 102A) may be deselected (i.e., the thermostat 104 may revert back to using its own temperature sensor 406 to control operation of the HVAC system 112) if the selected temperature monitoring device 102A is disconnected from the network 108 for a time period (e.g., ten minutes, fifteen minutes, or a different time period). Alternately or additionally, the selected temperature monitoring device (e.g., device 102A) may be deselected where the selected temperature monitoring device informs the thermostat 104 that its battery 320 is failing. In some embodiments, where one or more fail-safe condition 419 is met, an alert may be communicated to the user 110 instructing the user 110 to call a HVAC technician.

In embodiments, the user 110 may be able to use the client device 106 (e.g., an application stored thereon) and/or the input/output device 407 to activate the auto-configurator 420. The auto-configurator 420 may be configured to aggregate historical temperature data obtained by the temperature monitoring devices 102A-102D and the thermostat 104 to proactively control the operation of the HVAC system 112. The artisan understands that the HVAC system 112 cannot heat or cool an area within the structure 10 in isolation (e.g., cannot heat the first bedroom 12 without also heating the second bedroom 14 to some degree). The auto-configurator 420 may allow historical temperature data aggregated from multiple temperature monitoring devices (e.g., devices 102A-102D) and the thermostat 104 to be evaluated so that all rooms 12, 14, 16, and 18 may be maintained at a temperature close to a desirable (e.g., a user-defined) temperature.

In more detail, and as noted above, due to factors such as changing weather, arrangement and constitution of HVAC ducts, and the like, the difference between the temperature sensed by a temperature monitoring device (e.g., device 102A, device 102B, etc.) and the temperature sensed by the thermostat 104 may change during the course of the day. For example, the difference between the temperature sensed by the device 102A and the thermostat 104 may be 6° F. at 10 am, 10° F. at 6 pm, 7° F. at 10 pm, and so on. The auto-configurator 420 may be configured to aggregate temperature information from a plurality of temperature monitoring devices (e.g., devices 102A-102D) and the thermostat 104 to determine the time-varying offset 421 to apply to the thermostat 104 at various points during the day to cause each of the rooms 12, 14, 16, and 18 to be maintained at a temperature close to a desirable (e.g., a user-defined) temperature.

To illustrate, an example process to calculate the time-varying offset temperature 421 is set forth below. To compute the time-varying offset 421, the auto-configurator 420 may compile temperature data obtained from the temperature monitoring device 102A-102D and the thermostat 104 within the last two weeks (or a different length of time). The auto-configurator 420 may then divide the data from each day of the last two weeks into a plurality of equal time segments (e.g., a segment from midnight to 6 am, a segment from 6 am to noon, a segment from noon to 6 pm, and a segment from 6 pm to midnight). Next, the auto-configurator 420 may calculate the mean of the temperatures of the monitoring device 102A-102D and the thermostat 104 for each minute within each segment. The auto-configurator 420 may then compute the deviation of this mean from the temperature of the thermostat 104 for each minute (i.e., the auto-configurator 420 may determine for each minute the difference between the temperature indicated by the thermostat 104 and the mean of the temperatures indicated by the thermostat 104 and the devices 102A-102D). Once the deviation of the mean temperature from the thermostat temperature has been computed, the auto-configurator 420 may calculate the average deviation for each time segment. Finally, the auto-configurator 420 may linearly interpolate between the mean deviations of each time segment to generate a time-varying offset temperature 421 for each minute of the day. When the user 110 activates the auto-configurator 420, the auto-configurator 420 may apply this time-varying offset temperature 421 to the thermostat 104 based on the time of day. The auto-configurator 420 may recalculate the time-varying offset temperature 421 for each minute the next day in like fashion by evaluating the temperature data of the last two weeks. In this way, the auto-configurator 420 may take into account historical temperature data to better balance the temperature within the structure 10 in the future.

In some embodiments, the auto-configurator 420 may learn from the temperature settings set by the user 110 in the past to automatically control the temperature of the structure 10 in the future. For example, if the user 110 selects the temperature monitoring device 102C in the living room at 11:00 am every Saturday for a time period (e.g., for a month), in embodiments, the auto-configurator 420 may learn from this user behavior and proactively select the temperature monitoring device 102C at 11:00 am on coming Saturdays. Or, for example, if the user 110 reverts to the thermostat temperature at 10:00 pm each weekday night for a time period, the auto-configurator 420 may learn from this user behavior and automatically revert to the thermostat temperature at this time each weekday night. Of course, the user 110 may be allowed to deactivate all or part of the functionality of the auto-configurator 420 at any time. In some embodiments, the system 100 may include only part of the functionality of the auto-configurator 420 described herein.

The analytics module 422 may be configured to generate temperature insights 423 based on the user's use of the system 100. The insights 423 may be communicated to the user 110 over the temperature monitor and control application 510 on the client device 106. In embodiments, the insights 423 may include numerical data. Alternately or additionally, the insights 423 may in embodiments present information to the user 110 in a more readily digestible format.

For example, in embodiments, the insights 423 may outline the temperature sensed by each temperature monitoring device 102A-102D relative to the thermostat temperature. For instance, the analytics module 422 may compute a two week (or a different) historical average of the temperatures sensed by the temperature monitoring device 102A and the thermostat 104, and then determine a difference between these two historical averages. If the historical average temperature of the device 102A in the last two weeks is greater than the historical average temperature of the thermostat 104 and the difference is greater than 1.5° F. (or a different value), the insights 423 may outline that the temperature monitoring device 102A is "warmer" relative to the thermostat 104. Similarly, if the historical average temperature of the device 102A in the last two weeks is less than the historical average temperature of the thermostat 104 and the difference is less than 1.5° F. (or a different value), the insights 423 may outline that the temperature monitoring device 102A is "colder" relative to the thermostat 104. Such simplified labels (e.g., "warmer", "colder", etc.) may allow the user 110 to more readily determine the temperature of the monitoring device 102A relative to the thermostat 104 over lengths of time (as compared to plotting this data in graphs, providing numerical values for the differences in averages each day, etc.). Similarly, in embodiments, the insights 423 may characterize the monitoring device 102A-102D that has the highest average temperature (in the last two weeks or a different length of time) and the lowest average temperature as the "warmest" and "coldest" device, respectively. The insights 423 may also include a warning to indicate a loss of connectivity of a device 102A-102D, warnings to indicate low battery power levels of a device 102A-102D and/or to indicate the amount of time in which the battery of a device 102A-102D should be changed to ensure continued functionality thereof, a warning to indicate that a device 102A-102D is unresponsive, a warning to indicate that one of the fail-safe conditions 419 is met, etc. The warnings may be an audible warning, a visual warning, and/or a combination thereof, and may be communicated by the thermostat 104 and/or the client device 106 via the temperature monitor and control application 510 stored thereon.

Figure 5:
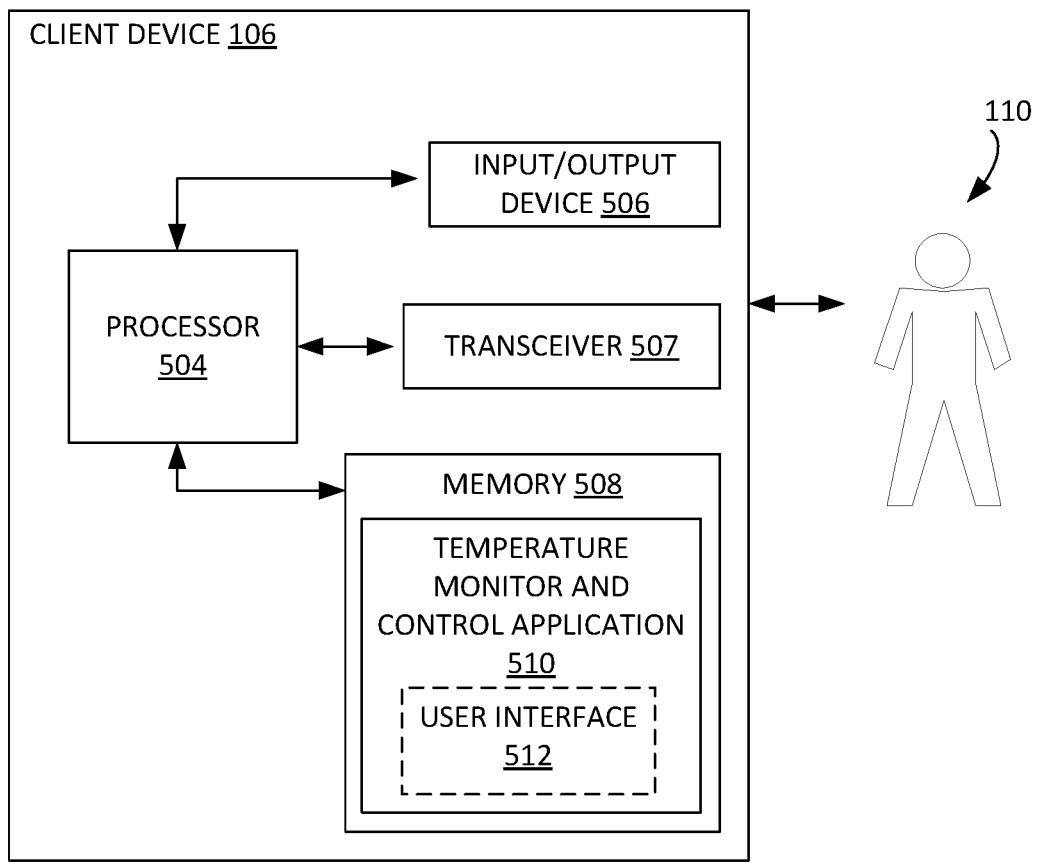
FIG. 5 is a schematic diagram of an example client device of the self-learning temperature monitor and control system of FIG. 2.

FIG. 5 shows the client device 106, in an embodiment. The client device 106 may be configured for use by the user 110. The user 110 may be an owner or operator of the system 100, a resident of (e.g., a tenant in) the structure 10, or any other user.

The client device 106 may be a stationary computing device (e.g., a desktop computer) or a mobile computing device (e.g., a laptop, a tablet, a smartphone, etc.). The client device 106 may comprise a processor 504 in data communication with one or more input/output device(s) 506, a transceiver 507, and a memory 508. The processor 504 may include one or more processors, such as one or more microprocessors, and/or one or more supplementary co-processors, such as math co-processors. The input/output device(s) 506 may comprise any suitable input and/or output device(s), such as a display, a speaker, a microphone, a retinal scanner, a touchscreen, a keyboard, a mouse, etc., for allowing the user 110 to interact with the client device 106. The transceiver 507 may be a wired transceiver and/or a wireless transceiver. The transceiver 507 may allow the client device 106 to send messages to and receive messages from the smart thermostat 104 over the network 108.

The memory 508 may be transitory memory, non-transitory memory, or a combination thereof. The memory 508 may include both volatile memory, such as random access memory (RAM), as well as non-volatile memory, such as read-only memory (ROM), hard drives, flash memory, or any other suitable memory/storage element. The memory 308 may include removable memory elements, such as a CompactFlash card, a MultiMediaCard (MMC), and/or a Secure Digital (SD) card. In certain embodiments, the memory 508 includes a combination of magnetic, optical, and/or semiconductor memory, and may include, for example, RAM, ROM, flash drive, and/or a hard disk or drive.

In embodiments, the memory 508 may include a temperature monitor and control application 510, which the user 110 may download onto the client device memory 508 over the web (e.g., from an "app store") or via other means. The temperature control application 510 may be password protected, encrypted, and/or otherwise secured. The temperature control application 510 may be stored in a transitory and/or a non-transitory portion of the memory 508. The temperature control application 510 may comprise software and/or firmware that contains machine-readable instructions executed by the processor 504 to perform the functionality of the client device 106 as described herein.

The temperature control application 510 may include a user interface 512 usable by the user 110 to interact with the system 100. For example, the user 110 may use the user interface 512 to select a temperature monitoring device(s) 102A-102D so that the HVAC system 112 may be regulated in view of the temperature sensed by the temperature sensor 304 of this selected device(s). Or, for instance, the user 110 may use the user interface 512 to query the temperature reading of a temperature monitoring device 102A-102D, activate the auto-configurator 420, activate the heating or cooling system of the HVAC system 112, check the connectivity of the temperature monitoring devices 102A-102D, review one or more temperature insights 423, etc. In some embodiments, the client device 106 may be omitted from the system 100 and the user 110 may be required to interact with the system 100 via the input/output device 407 of the smart thermostat (and/or the input/output device 312 of the temperature monitoring devices 102A-102D). In other embodiments, the temperature monitor and control application 510 may be configured to allow the user 110 to interact with two or more systems 100 (e.g., the user 110 may use the user interface 512 of the temperature control application 510 to interact with the system 100 in his house and another system 100 at his workplace).

Figure 6:
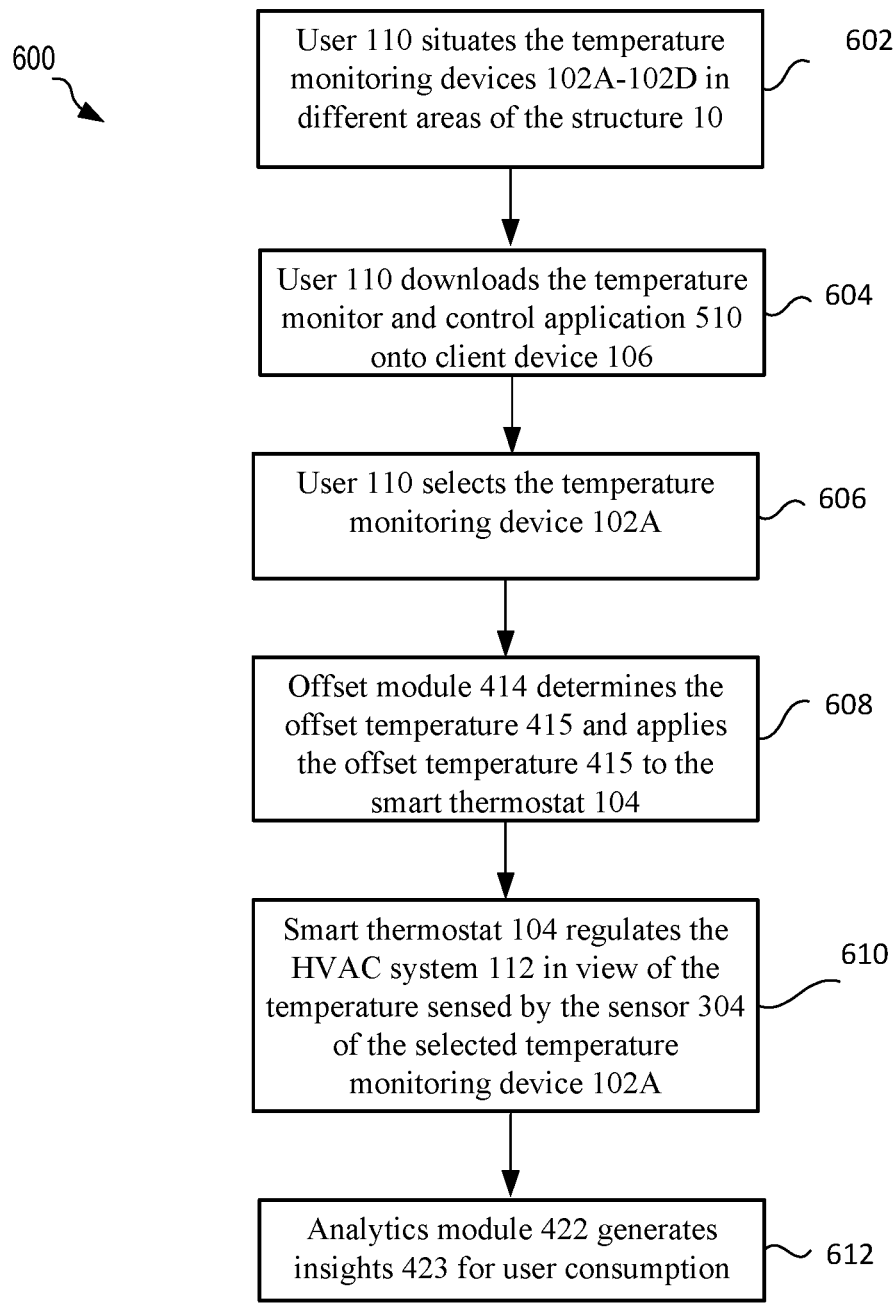
FIG. 6 is a flowchart illustrating a method for using the self-learning temperature monitor and control system of FIG. 2, in an embodiment.

Attention is directed now to FIG. 6, which shows an example method 600 for using the self-learning temperature monitor and control system 100. At step 602, the user 110 may situate the temperature monitoring devices 102A-102D in different areas of the structure 10. For example, the user 110 may situate the first temperature monitoring device 102A, the second temperature monitoring device 102B, the third temperature monitoring device 102C, and the fourth temperature monitoring device 102D in the first bedroom 12, the second bedroom 14, the living room 16, and the game room 18, respectively. At step 604, the user 110 may download the temperature monitor and control application 510 onto the client device memory 508. The artisan will understand that the user 110 may also download the temperature monitor and control application 510 before situating the temperature monitoring devices 102A-102D in different areas of the structure 10 at step 602.

At step 606, the user 110 may select a temperature monitoring device (e.g., the user 110 may select the temperature monitoring device 102A in the first bedroom where the user 110 is currently situated). At step 608, the offset module 414 of the smart thermostat software 410 may determine the offset temperature 415 as discussed above and apply this offset temperature to the smart thermostat 104. At step 610, because of the applied offset temperature 415, the smart thermostat 104 may regulate the HVAC system 112 in view of the temperature sensed by the temperature sensor 304 of the selected temperature monitoring device 102A (as opposed to in view of the temperature sensed by the temperature sensor 406 of the thermostat 104). At step 612, the analytics module 422 may generate a temperature insight 423 for user consumption. For example, the analytics module 422 may identify whether the average temperature of the temperature monitoring device 102A over the last two weeks is more than 1.5° F. greater than (or less than) that the average temperature of the thermostat 104 during this time period. The user 110 may cause the analytics module 422 to generate the insights 423 on command; alternately or additionally, the analytics module 422 may generate the insights and communicate same to the client device 106 and the user 110 may use the user interface 512 to review the insights 423 as desired.

Figure 7:
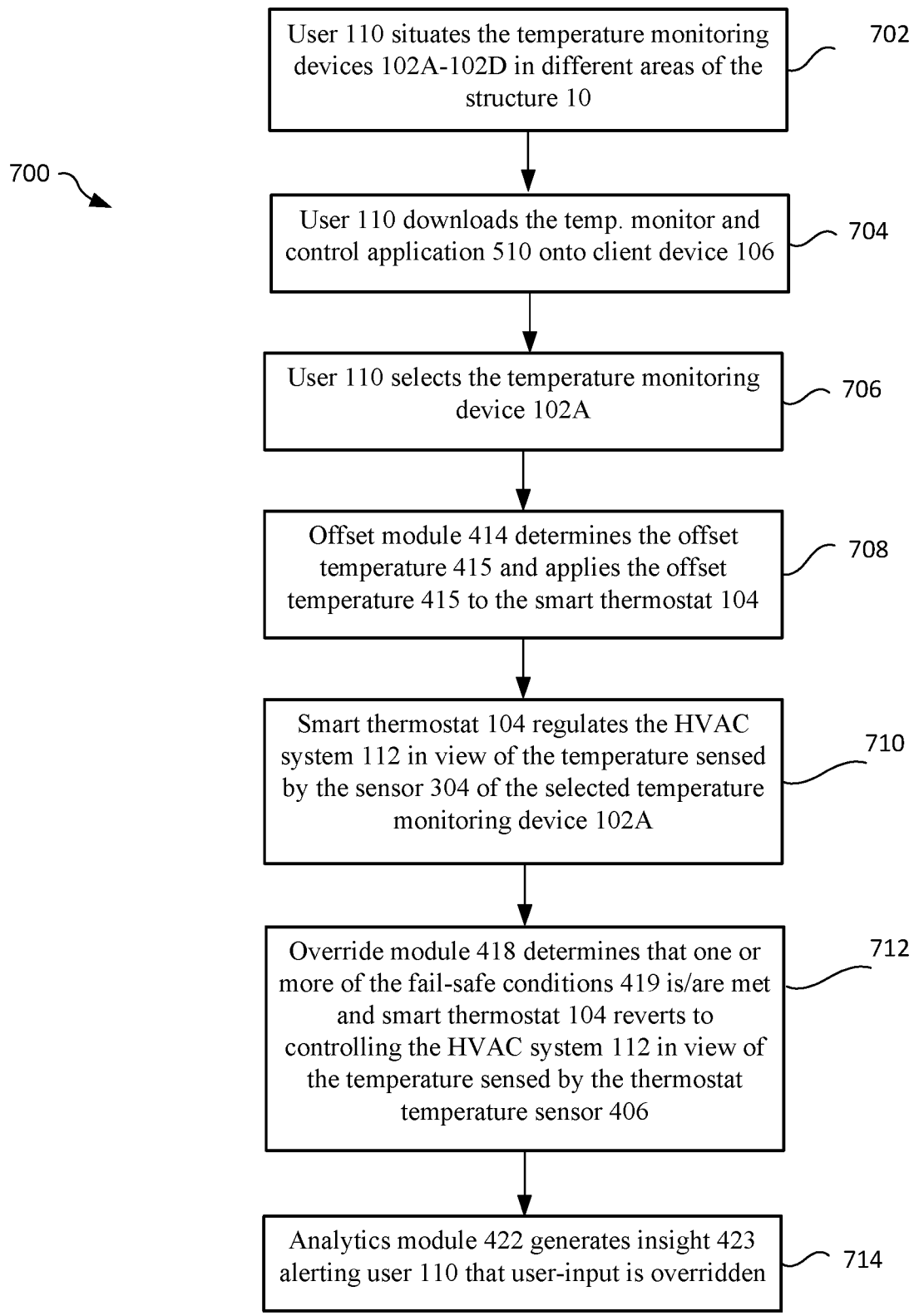
FIG. 7 is a flowchart illustrating another method for using the self-learning temperature monitor and control system of FIG. 2, in an embodiment.

Focus is directed to FIG. 7, which shows another example method 700 for using the self-learning temperature monitor and control system 100. At step 702, the user 110 may situate the temperature monitoring devices 102A-102D in different areas of the structure 10. For example, and as discussed above for step 602 of the method 600, the user 110 may situate the first temperature monitoring device 102A, the second temperature monitoring device 102B, the third temperature monitoring device 102C, and the fourth temperature monitoring device 102D in the first bedroom 12, the second bedroom 14, the living room 16, and the game room 18, respectively. At step 704, the user 110 may download the temperature monitor and control application 510 onto the client device memory 508. At step 706, the user 110 may select a temperature monitoring device (e.g., the user 110 may select the temperature monitoring device 102A in the first bedroom). At step 708, the offset module 414 of the smart thermostat software 410 may determine the offset temperature 415 as discussed above and apply this offset temperature to the smart thermostat 104. At step 710, the smart thermostat 104 may regulate the HVAC system 112 in view of the temperature sensed by the temperature sensor 304 of the selected temperature monitoring device 102A.

At step 712, the override module 418 of the smart thermostat 104 may determine that one or more of the fail-safe conditions 419 is/are met. The override module 418 may therefore cause the smart thermostat 104 to revert to controlling the HVAC system 112 in view of the temperature sensed by the temperature sensor 406 of the smart thermostat 104 itself. At step 714, the analytics module 422 may generate an insight 423 alerting the user 110 that the user-input has been overridden. As discussed above, the alert may be a visual alert and/or an audible alert, and may be communicated to the user 110 by one or both of the smart thermostat 104 and the client device 106.

Figure 8:
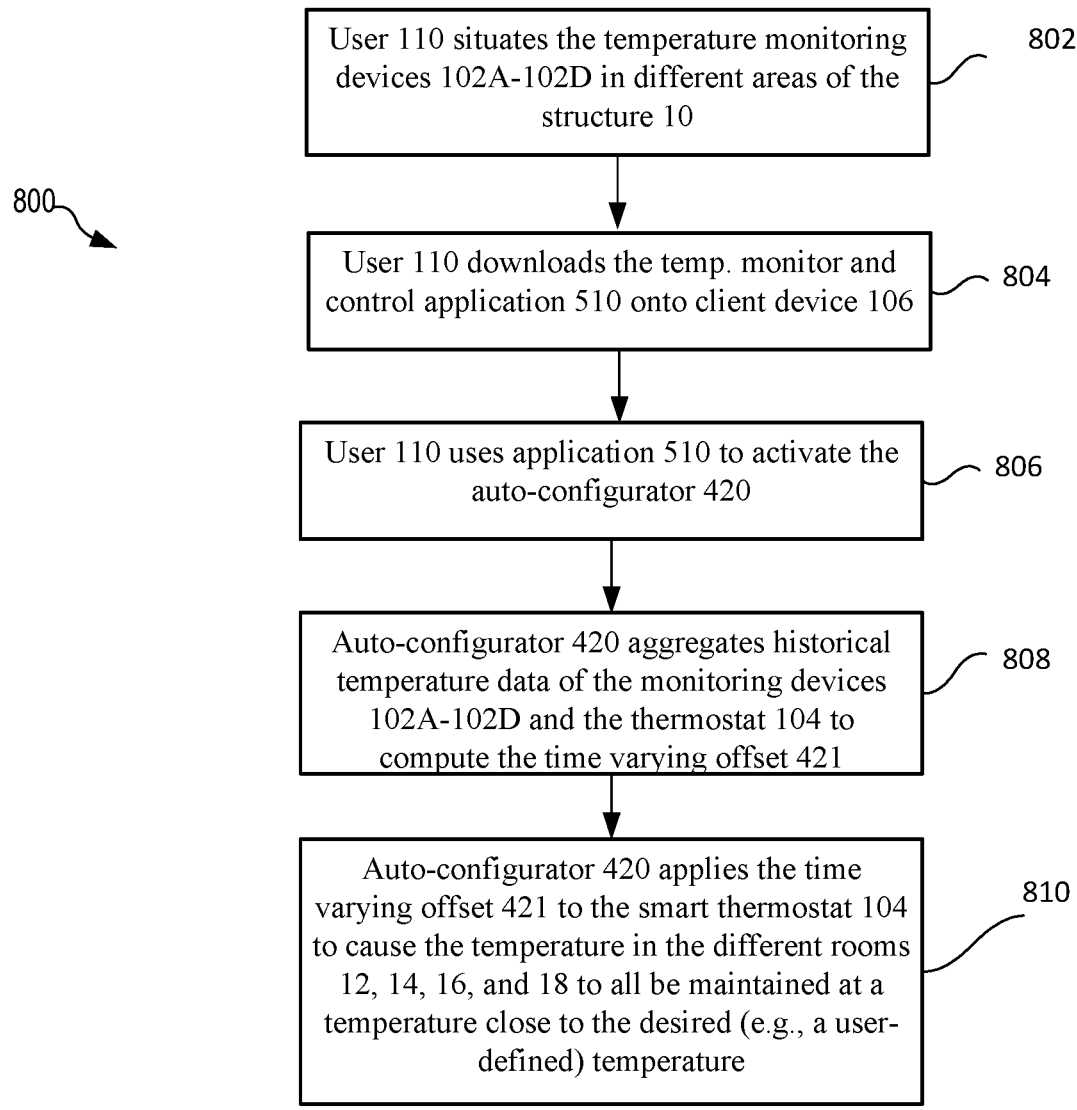
FIG. 8 is a flowchart illustrating yet another method for using the self-learning temperature monitor and control system of FIG. 2, in an embodiment.

Attention is directed now to FIG. 8, which shows yet another example method 800 for using the self-learning temperature monitor and control system 100. At step 802, the user 110 may situate the temperature monitoring devices 102A-102D in different areas of the structure 10. At step 804, the user 110 may download the temperature monitor and control application 510 onto the client device 106. At step 806, the user 110 may use the temperature monitor and control application 510, e.g., the user interface 512 thereof, to activate the auto-configurator 420. At step 808, the auto-configurator 420 may aggregate historical temperature data of the temperature monitoring devices 102A-102D and the thermostat 104 to compute the time varying offset 421, as discussed herein. At step 810, the auto-configurator 420 may apply the time-varying offset 421 to the smart thermostat 104 to cause the temperature in the different rooms 12, 14, 16, and 18 to all be maintained at a temperature close to a desired (e.g., a user-defined) temperature.

Thus, as has been described, the temperature monitor and control system 100 may monitor and evaluate information from temperature monitoring devices 102A-102D and the thermostat 104 to intelligently and robustly control the operation of the HVAC system 112. Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A temperature monitor and control system, comprising:
a temperature monitoring device wirelessly coupled to a network;
a thermostat, remote from said temperature monitoring device, configured to sense temperature measurements and regulate a HVAC system, wherein:
the thermostat is installed in a different location than the temperature monitoring device, which causes a different temperature to be measured by the thermostat than the temperature monitoring device;
said thermostat coupled to said network and having a processor and a memory comprising computer-readable instructions; said processor configured to execute said instructions to:
wirelessly receive a first temperature from said temperature monitoring device, wherein the first temperature was sensed by said temperature monitoring device;
sense a second temperature by said thermostat, wherein the first temperature and the second temperature change over time;
determine a difference between said first temperature sensed by said temperature monitoring device and said second temperature sensed by said thermostat;
cause said thermostat to regulate said HVAC system in view of said difference; and
override said thermostat regulating said HVAC system in view of said difference based on a determination that a fail-safe condition is met, wherein:
different threshold values are used to determine that the fail-safe condition is met depending on whether HVAC heating or HVAC cooling is activated; and
overriding comprises causing said thermostat to regulate said HVAC system in view of only said second temperature sensed by said thermostat.

2. The temperature monitor and control system of claim 1, wherein said temperature monitoring device has a sampling frequency for sampling temperature and a reporting frequency for reporting said sampled temperature to said thermostat, said sampling frequency being greater than said reporting frequency.

3. The temperature monitor and control system of claim 2, wherein said temperature monitoring device is selectable by a user via a client device.

4. The temperature monitor and control system of claim 1, wherein said temperature monitoring device includes a motion sensor configured to determine a presence of a user.

5. The temperature monitor and control system of claim 1, wherein said processor is further configured to execute said instructions to determine a time-varying offset temperature, said time-varying offset temperature based at least in part on an evaluation of historical temperature readings of said temperature monitoring device relative to historical temperature readings of said thermostat.

6. The temperature monitor and control system of claim 1, wherein said temperature monitoring device comprises a button usable by a user to cause said thermostat to select said temperature monitoring device for said determination of said difference.

7. The temperature monitor and control system of claim 1, wherein said temperature processor is further configured to execute said instructions to generate a temperature insight viewable by a user on a client device remote from said thermostat.

8. The temperature monitor and control system of claim 7, wherein said temperature insight characterizes an average historical temperature of said temperature monitoring device relative to an average historical temperature of said thermostat.

9. A computer-implemented method for monitoring and controlling operation of a HVAC system within a structure, comprising:
providing a thermostat configured to regulate said HVAC system;
situating a plurality of battery-operated temperature monitoring devices within said structure, wherein:
the thermostat is installed in a different location than the plurality of battery-operated temperature monitoring devices, which causes a different temperature to be measured by the thermostat than at least one of the plurality of battery-operated temperature monitoring devices;
receiving a user command, said user command including a selection of said at least one of said battery-operated temperature monitoring devices;
computing, a difference based on an evaluation of a first temperature reading made by said at least one selected battery-operated temperature monitoring device relative to a second temperature reading made by said thermostat, wherein the first temperature and the second temperature change over time;
applying said difference to said thermostat to cause said thermostat to regulate said HVAC system in view of said difference; and
overriding regulation of said HVAC system in view of said difference based on a determination that a fail-safe condition has been met, wherein:
different threshold values are used to determine that a fail-safe condition is met depending on whether HVAC heating or HVAC cooling is activated; and
overriding comprises causing said thermostat to regulate said HVAC system in view of only said second temperature reading made by said thermostat.

10. The method of claim 9, wherein said at least one selected battery-operated temperature monitoring device has a sampling frequency and a reporting frequency, said sampling frequency being greater than said reporting frequency.

11. The method of claim 9, further comprising the step of determining that said fail-safe condition is met where said at least one selected battery-operated temperature monitoring device is disconnected from a network for a time period.

12. The method of claim 9, further comprising the step of generating a temperature insight viewable by a user on a client device remote from said thermostat.

13. The method of claim 12, wherein said temperature insight characterizes an average historical temperature of said at least one selected battery-operated temperature monitoring device relative to an average historical temperature of said thermostat.

14. A method for monitoring and controlling operation of a HVAC system within a structure, comprising:
providing a thermostat configured to regulate said HVAC system;
situating a plurality of battery-operated temperature monitoring devices within said structure, wherein:
the thermostat is installed in a different location than the plurality of battery-operated temperature monitoring devices, which causes a different temperature to be measured by the thermostat than at least one temperature monitoring device of the plurality of battery-operated temperature monitoring devices;

coupling said thermostat and each of said plurality of battery-operated temperature monitoring devices to a network;

receiving over said network a user command, said user command including a selection of the at least one of said battery-operated temperature monitoring devices;

computing, at the thermostat, a difference based on an evaluation of a first temperature reading of said at least one selected battery-operated temperature monitoring device and a second temperature reading sensed by said thermostat, wherein the first temperature and the second temperature change over time;

cause said thermostat to regulate said HVAC system in view of said difference; and overriding said thermostat regulating said HVAC system in view of said difference based on a determination that an override condition is met, wherein different threshold values are used to determine that the override condition is met depending on whether HVAC heating or HVAC cooling is activated; and overriding comprises causing said thermostat to regulate said HVAC system in view of only said second temperature sensed by said thermostat.

15. The method of claim 14, further comprising determining that said override condition is met where a battery of said at least one selected battery-operated operated temperature monitoring device fails.

16. The method of claim 14, wherein each of said plurality of battery-operated temperature monitoring devices is configured to be portable.

17. The temperature monitor and control system of claim 1, wherein the override condition is a difference between said second temperature sensed by said thermostat and a setpoint of said thermostat meeting a stored threshold.

18. The method of claim 14, wherein the override condition is a difference between said second temperature sensed by said thermostat and a setpoint of said thermostat meeting a stored threshold.

* * * * *